(12) United States Patent
Snow et al.

(10) Patent No.: US 8,675,923 B2
(45) Date of Patent: Mar. 18, 2014

(54) PROVIDING FEEDBACK ABOUT AN IMAGE OF A FINANCIAL DOCUMENT

(75) Inventors: David J. Snow, San Diego, CA (US);
Brian W. Farwell, Oceanside, CA (US);
Amir Eftekhari, San Diego, CA (US);
Carol A. Howe, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 231 days.

(21) Appl. No.: 12/840,681

(22) Filed: Jul. 21, 2010

(65) Prior Publication Data
US 2012/0020532 A1    Jan. 26, 2012

(51) Int. Cl.
*G06K 9/00*    (2006.01)

(52) U.S. Cl.
USPC .......................... 382/112; 382/135; 382/137

(58) Field of Classification Search
USPC ......................................... 382/112, 135–140
See application file for complete search history.

(56) References Cited

U.S. PATENT DOCUMENTS

| | | | | |
|---|---|---|---|---|
| 6,055,327 | A * | 4/2000 | Aragon | 382/138 |
| 2008/0002911 | A1* | 1/2008 | Eisen et al. | 382/283 |
| 2008/0219543 | A1* | 9/2008 | Csulits et al. | 382/135 |
| 2009/0141962 | A1* | 6/2009 | Borgia et al. | 382/139 |
| 2009/0190823 | A1* | 7/2009 | Walters | 382/137 |
| 2009/0228380 | A1* | 9/2009 | Evanitsky | 705/31 |
| 2010/0202026 | A1* | 8/2010 | Chiu et al. | 358/488 |
| 2011/0255794 | A1* | 10/2011 | Neogi et al. | 382/203 |
| 2011/0280450 | A1* | 11/2011 | Nepomniachtchi et al. | 382/112 |

* cited by examiner

*Primary Examiner* — Bernard Krasnic
*Assistant Examiner* — Weiwen Yang
(74) *Attorney, Agent, or Firm* — Park, Vaughan, Fleming & Dowler LLP; Steven E. Stupp

(57) ABSTRACT

A technique for providing feedback about an image of a financial document to a user is described. During this feedback technique, the user provides the image of a financial document, such as W-2 form. For example, the user may take a picture of or may scan the financial document. This image may be analyzed using predefined information in a set of financial documents (such as different types of income-tax documents), and a quality metric for the image may be determined using the analysis. Moreover, the feedback, which is based on the determined quality metric, may be provided to the user. For example, the user may be instructed to retake the image, and the instructions may include an image of the desired orientation and content. In this way, the user may be advised as to how to improve the quality metric in the revised image.

21 Claims, 6 Drawing Sheets

PROVIDING FEEDBACK ABOUT AN IMAGE OF A FINANCIAL DOCUMENT

BACKGROUND

The present disclosure relates to a software product. More specifically, the present disclosure relates to techniques for providing feedback to a user about an image of a financial document.

Advances in optical character recognition (OCR) allow information to be extracted from physical documents (or images of these documents). However, it is still often difficult to perform OCR on financial documents. For example, in the case of a W-2 form, there are usually multiple copies or instances of the relevant financial information in a given W-2 form, including Federal, State and Local copies of an individual's annual financial information. If the individual provides an image that includes all of these copies, the alphanumeric text in the image may be too small for an OCR technique to resolve or there may be too much information for the OCR technique to analyze accurately, i.e., the OCR technique may fail.

When such a failure occurs, it may be confusing and/or frustrating to the individual. In particular, they may not understand why the failure occurred or what to do to rectify it. Furthermore, the individual may be forced to manually enter the financial information from the financial document for subsequent use by financial software (such as income-tax preparation software). However, manual entry of data is time-consuming, frustrating and prone to error. Consequently, the difficulties in performing OCR on financial documents may decrease the satisfaction (and, thus, the retention) of users of financial software.

SUMMARY

The disclosed embodiments relate to a system that provides feedback about an image of a financial document to a user. During operation, the system receives the image of the financial document from the user. Then, the system analyzes the image based on predefined information in a set of financial documents, and determines a quality metric for the image based on the analysis. Next, the system provides the feedback to the user based on the determined quality metric, thereby informing the user how to generate a second image with an improved quality metric relative to the quality metric of the image.

Note that the financial document may include an income-tax document (such as a W-2 form). Furthermore, analyzing the image may involve: optical character recognition or image processing; identifying a location with financial information in the image (such as a field in the financial document); cropping the image; detecting the number of horizontal (or parallel) lines or the number of boxes in the image; and/or identifying the financial document (for example, identifying that the financial document is a W-2 form).

Moreover, the quality metric may include information about extraneous information in the image. For example, the extraneous information may include information about multiple copies of the financial document that are included in the image.

In some embodiments, the feedback includes instructions to the user to generate the second image. For example, the user may be instructed to generate the second image by taking a photograph of or scanning at least a portion of the financial document. Furthermore, the instructions may specify an orientation of the second image and/or a portion of the financial document to include in the second image. Additionally, the feedback may include a third image that illustrates the orientation of the second image and/or the portion of the financial document to include in the second image.

Another embodiment provides a method that includes at least some of the operations performed by the system.

Another embodiment provides a computer-program product for use with the system. This computer-program product includes instructions for at least some of the operations performed by the system.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of a system (such as an electronic device or a computer system), a technique for providing feedback about an image of a financial document to a user, and a computer-program product (e.g., software) for use with the system are described. During this feedback technique, the user provides the image of a financial document, such as W-2 form. For example, the user may take a picture of or may scan the financial document. This image may be analyzed using predefined information in a set of financial documents (such as different types of income-tax documents), and a quality metric for the image may be determined using the analysis. Moreover, the feedback, which is based on the determined quality metric, may be provided to the user. For example, the user may be instructed to retake the image, and the instructions may include an image of the desired orientation and content. In this way, the user may be advised as to how to improve the quality metric in the revised image.

By guiding the remedial action of the user, this feedback technique may assist the user in generating a suitable image of the financial document, such as an image that includes financial information that is to be extracted from the image. Moreover, this financial information may be provided without extraneous information, which may improve the accuracy and/or the efficiency of a subsequent optical-character-recognition (OCR) technique that is used to extract the financial information from at least a portion of the image. Furthermore, by improving the performance of the OCR technique, this feedback technique may reduce the user effort needed to provide the financial information, for example, the user may not have to enter the financial information or may not have to verify the financial information extracted using the OCR technique. In turn, the improved OCR accuracy may reduce or obviate the need for user verification of the extracted financial information, and may reduce errors by financial software that uses this financial information. All of which may improve the satisfaction (and retention) of these users with the financial software, as well as the profitability and market share of the provider of the financial software.

In the discussion that follows, the user may include one of a variety of entities, such as: an individual (for example, an existing customer, a new customer, a service provider, a vendor, a contractor, etc.), an organization, a business and/or a government agency. Furthermore, a 'business' should be understood to include: for-profit corporations, non-profit corporations, organizations, groups of individuals, sole proprietorships, government agencies, partnerships, etc.

Figure 1:
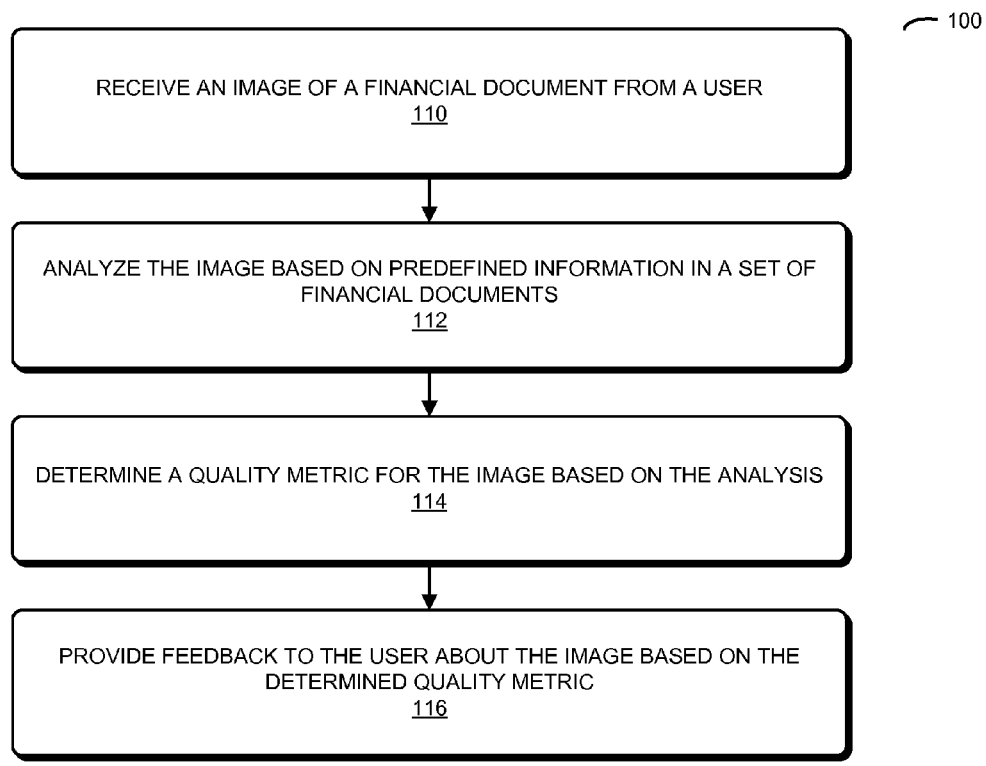
FIG. 1 is a flow chart illustrating a method for providing feedback about an image of a financial document to a user in accordance with an embodiment of the present disclosure.
Figure 4:
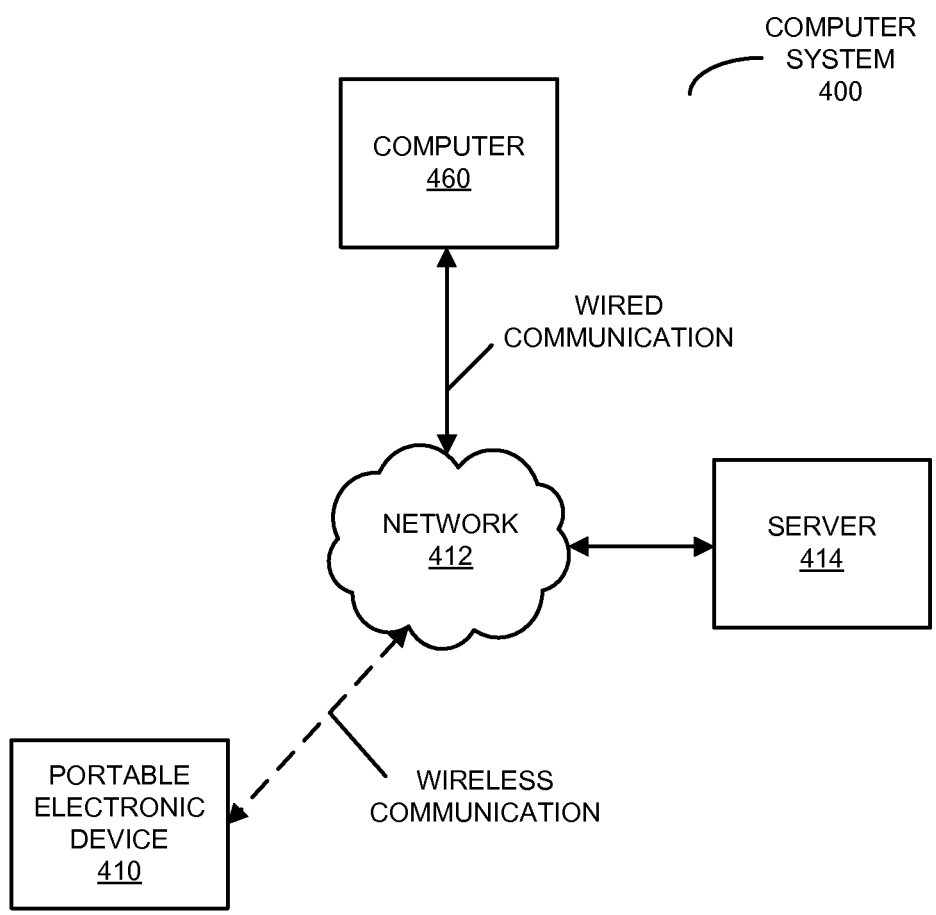
FIG. 4 is a block diagram illustrating a system that performs the method of FIGS. 1 and 2 in accordance with an embodiment of the present disclosure.
Figure 5:
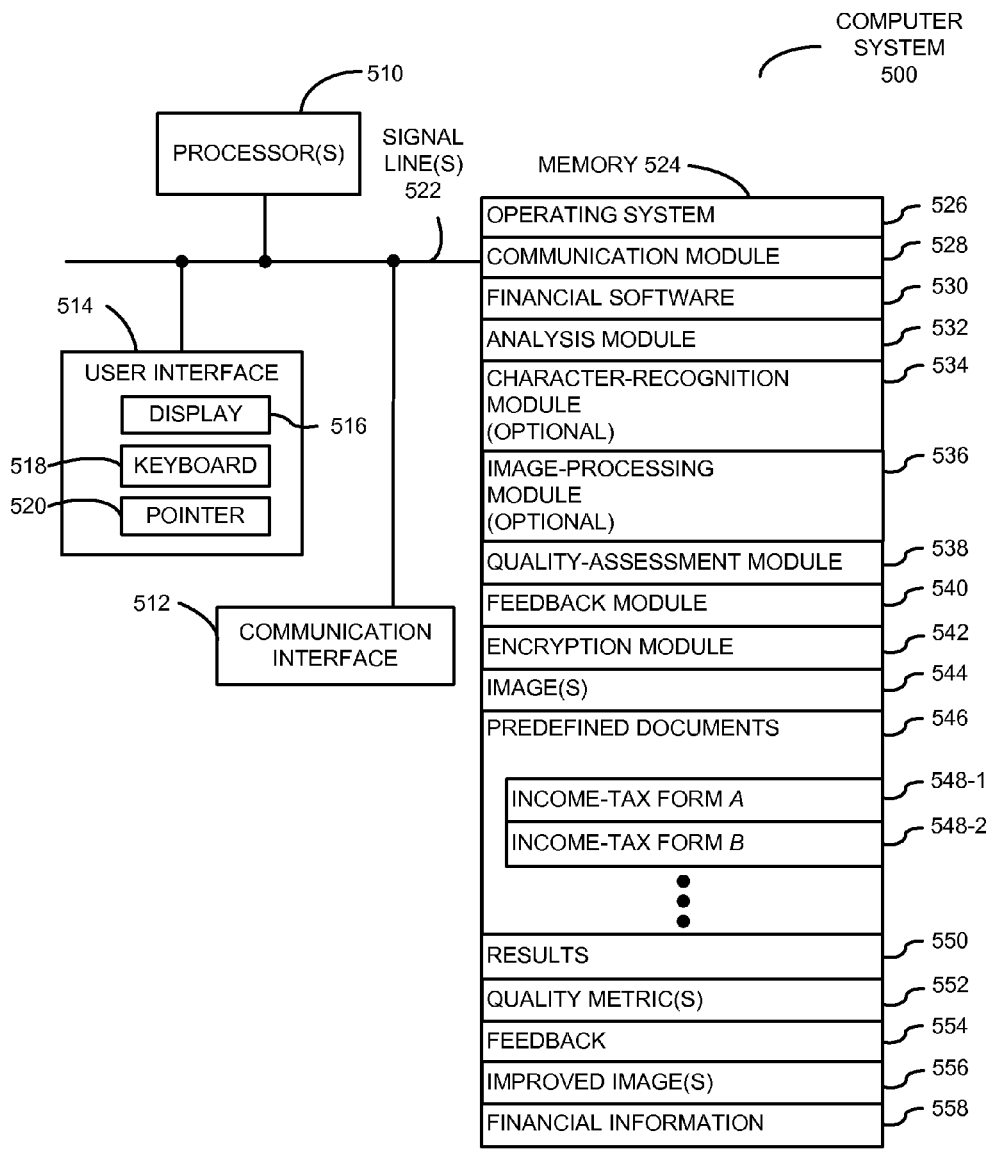
FIG. 5 is a block diagram illustrating a system that performs the method of FIGS. 1 and 2 in accordance with an embodiment of the present disclosure.

We now describe embodiments of the feedback technique. FIG. 1 presents a flow chart illustrating a method 100 for providing feedback about an image of a financial document to a user, which may be performed by an electronic device or a system, such as system 400 (FIG. 4) or system 500 (FIG. 5). During operation, the system receives the image of the financial document from the user (operation 110). Note that the financial document may include an income-tax document (such as a W-2 form).

Then, the system analyzes the image based on predefined information in a set of financial documents (operation 112), such as a set of income-tax documents. In particular, analyzing the image may involve optical character recognition or image processing. For example, the image may be analyzed to: identify a location with financial information in the image (such as a field in the financial document); crop the image; and/or identify the financial document (for example, identifying that the financial document is a W-2 form). In some embodiments, analyzing the image involves identifying (and extracting) information about lines and boxes in the financial document. Note that by cropping the image or focusing on relevant financial information based on the predefined information in the set of financial documents (such as that at the location in the image), this operation may improve the performance of the OCR technique (e.g., it may facilitate document-specific OCR handling).

Moreover, the system determines a quality metric for the image based on the analysis (operation 114). For example, the quality metric may indicate whether or not the image is suitable for accurate processing using the OCR technique. In some embodiments, the quality metric may include information about extraneous information in the image. For example, the extraneous information may include information about multiple copies of financial information that are included in the image, such as when the user takes a picture of Federal, State and/or Local copies of their W-2 form.

Figure 3:
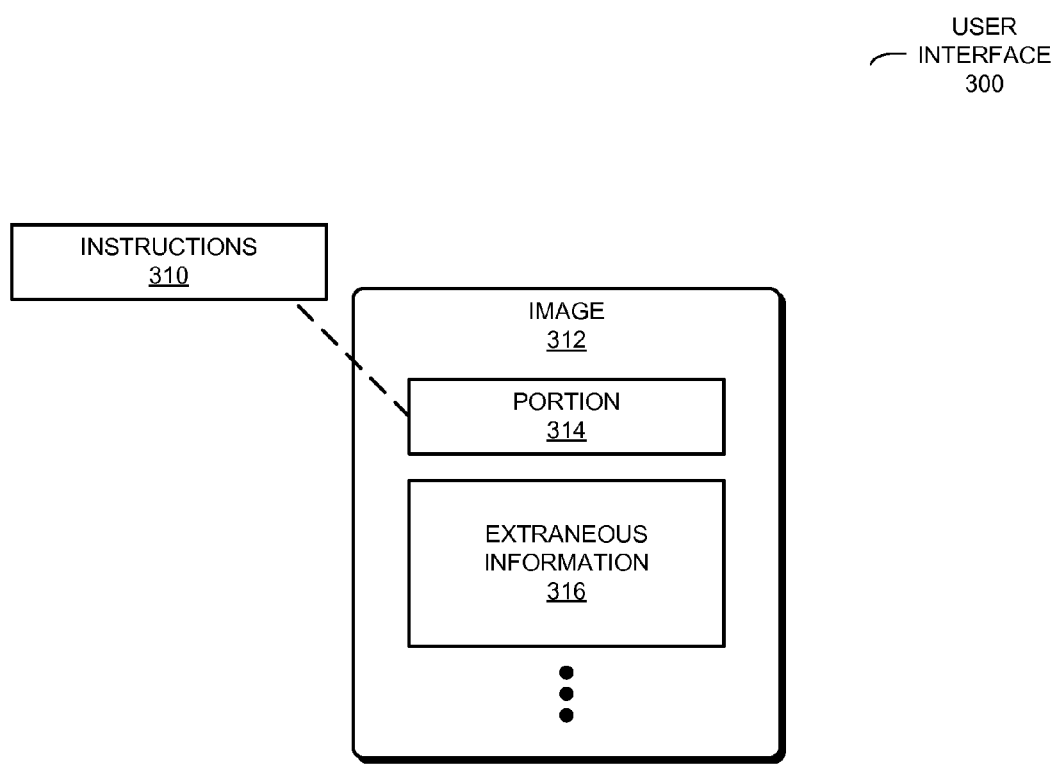
FIG. 3 is a block diagram illustrating a user interface with the feedback about the image that is provided to the user in the method of FIGS. 1 and 2 in accordance with an embodiment of the present disclosure.

Next, the system provides the feedback to the user based on the determined quality metric (operation 116), thereby informing the user how to generate a second image with an improved quality metric relative to the quality metric of the image. In some embodiments, the feedback includes instructions to the user to generate the second image. For example, the user may be instructed to generate the second image by taking a photograph of or scanning at least a portion of the financial document. Furthermore, the instructions may specify an orientation of the second image and/or a portion of the financial document to include in the second image. Additionally, as shown in FIG. 3, the feedback may include a third image that illustrates the orientation of the second image and/or the portion of the financial document to include in the second image.

In an exemplary embodiment, operations in method 100 may be implemented on a portable electronic device (such as a cellular telephone, tablet personal computer or a digital camera) and/or a server (such as a server in a client-server architecture that communicates with the cellular telephone). For example, depending on the available processing capability on the cellular telephone and/or the bandwidth or data rate of the communication channel or link (such as a wireless network or the Internet) between the cellular telephone and the server, at least some low-level OCR may be performed the cellular telephone. This low-level OCR may facilitate faster analysis by reducing the amount of subsequent processing (if any) at the server. Alternatively or additionally, the image may be cropped on the cellular telephone, thereby reducing the data rate needed to communicate the resulting image and/or reducing the power consumption (and increasing the battery life) of the cellular telephone.

Figure 2:
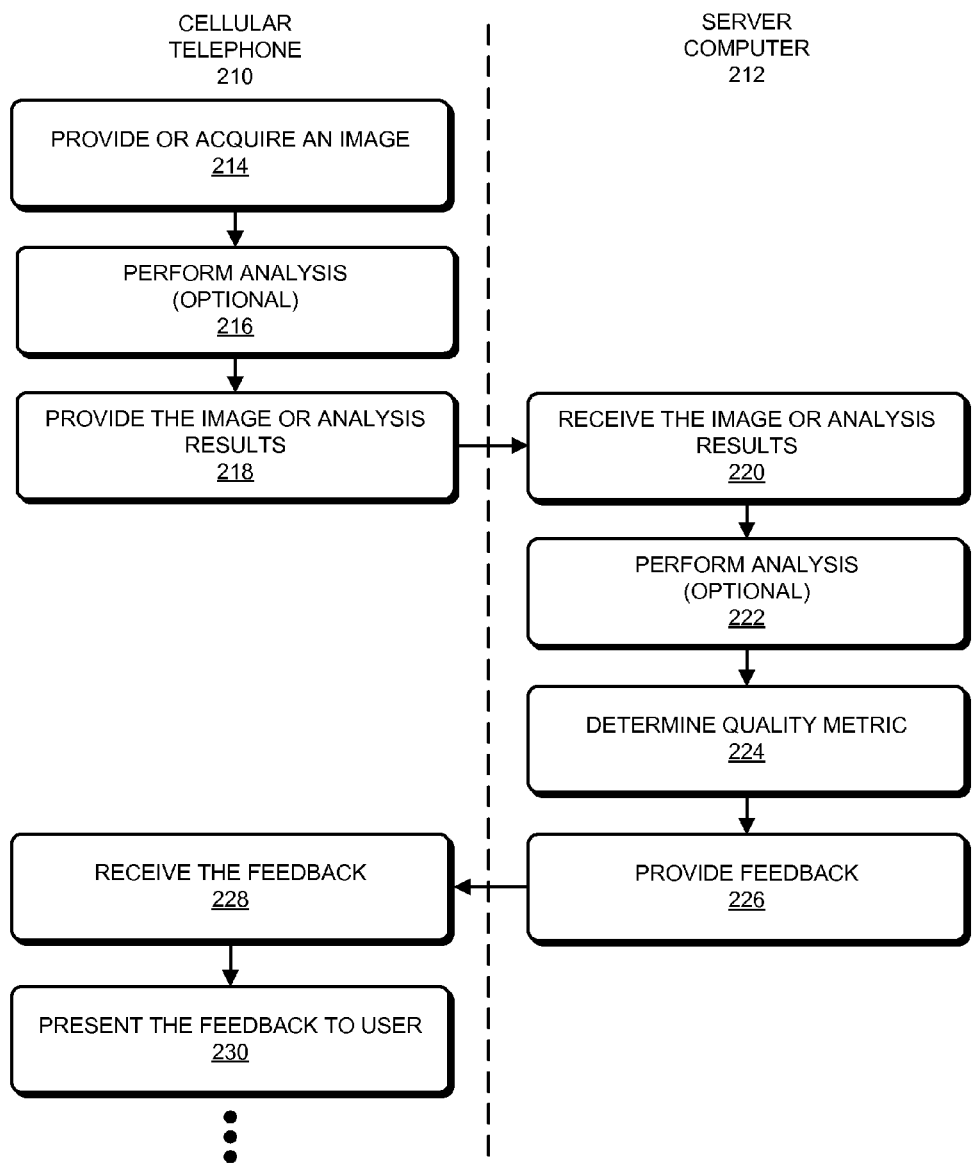
FIG. 2 is a flow chart illustrating the method of FIG. 1 in accordance with an embodiment of the present disclosure.

This hybrid approach to implementing the feedback technique is shown in FIG. 2, which presents a flow chart illustrating method 100. During this method, a user of cellular telephone 210 (and, more generally, an electronic device, such as a portable electronic device or a client computer) provides or acquires an image of a financial document (operation 214). For example, after receiving a W-2 form from their employer or an invoice from a vendor, the user may take a picture of or scan the financial document, such as by using a camera or a scanner in cellular telephone 210. Then, cellular telephone 210 may optionally perform at least a portion of the analysis on the image (operation 216).

Moreover, cellular telephone 210 may provide the image and/or the results of the portion of the analysis to server 212 (operation 218). After receiving this information (operation 220), server 212 may optionally perform the remainder of the analysis using the predefined information in the set of financial documents (operation 222), and may determine the quality metric associated with the image using the analysis (operation 224).

Furthermore, based on the determined quality metric, server 212 may provide the feedback to cellular telephone 210 (operation 226). This feedback may be received by cellular telephone 210 (operation 228), which then presents it to the user (operation 230), thereby informing the user how to generate an improved version of the image with an improved quality metric (e.g., a version of the image that is more suitable for the OCR technique).

In some embodiments of method 100 (FIGS. 1 and 2) there may be additional or fewer operations. For example, operations in method 100 (FIGS. 1 and 2) may be iterated one or more times, thereby providing dynamic (real-time) feedback to the user about one or more image(s) of the financial document. Furthermore, as noted previously, operations in method 100 (FIGS. 1 and 2) may be performed on a portable electronic device (such as a cellular telephone), a desktop computer and/or a server. Thus, as shown in FIG. 2, portions of method 100 (FIGS. 1 and 2) may be performed on a cellular telephone, with the remainder performed on a server. (Note that as the capabilities of cellular telephones increase, more or even all of the operations in the method may be performed on the cellular telephone). Additionally, the order of the operations may be changed, and/or two or more operations may be combined into a single operation.

In an exemplary embodiment, an image of a W-2 form includes multiple copies (or instances) of financial information. For example, a W-2 form typically includes multiple copies of the same financial information on a single perforated sheet. When a user takes a picture of this form, they often take a picture of the entire financial document (as opposed to one of the copies). The resulting extraneous information in the image can cause the OCR technique to fail. In particular, the alphanumeric text in the image may be too small for the OCR technique to handle properly, or there may be too much information in the image.

Furthermore, because users typically do not instinctively take a photograph of a single copy of the financial information in a W-2 form, it may be difficult to help them correct or rectify the problem. In particular, telling them what they need to do (such as how to: zoom in on one copy, tear off one copy or cover up everything but one copy) can be complicated. On the other hand, if users do instinctively take a picture of a single copy, they may be overloaded by detailed instructions that aren't relevant to them, which can be frustrating, inefficient, and even confusing. These challenges are often compounded by the different formats of W-2 forms (such as those provided by different payroll firms or providers), which makes simple, static instructions inaccurate and misleading.

The feedback technique described previously may overcome these problems and may provide the right amount of assistance to those users who need help (without unnecessary information overload). Thus, this approach may improve the user's experience (including reducing the effort required, as well as any errors that may occur when they take pictures of financial documents), with a commensurate impact on customer satisfaction and retention.

For example, an income-tax form associated with the financial document may be identified on a digital camera or cellular telephone when the user is taking a picture of the financial document (such as a W-2 form). (Alternatively, this information may be displayed on the screen of a personal computer or a tablet personal computer after the user scan's the financial document using a printer.) In particular, if there is sufficient processing power and/or battery life in the digital camera or the cellular telephone, a 'rough pass' of lines, blocks and/or alphanumeric text locations may be performed on the general layout of the financial document, and this information may be compared to a library of W-2 form layouts. If it is apparent that the user is taking a picture of multiple copies of the financial information in a given W-2 form (for example, the number of copies may be determined based on the number of lines in the image of the financial document), feedback may be provided. This feedback may take a variety of forms, including: a live photograph 'preview' that provides on-the-fly guidance in a 'pre-photograph' view that is displayed on: the digital camera, the cellular telephone, the personal computer, the tablet personal computer, etc. This pre-photograph view may indicate: what part(s) of the financial document the user should focus in on; whether to rotate the camera to a different orientation to get a bigger image, etc. Alternatively or additionally, after the user takes the photograph, an area that they should zoom in on may be identified, and the user may be instructed to retake the picture.

Note that a variety of techniques may be used to identify the financial document based on the predefined information in the set of financial documents (i.e., the library). For example, when the image is being analyzed using the OCR technique, a reliable block of text in the upper-left quadrant of the image (such as an employee's Social Security number) may be identified. Then, other areas or portions of the image that may have the same text in the financial-document layout may be analyzed. If the same text is recognized in any of these places, the OCR technique may leverage this to identify the financial document. Alternatively or additionally, the form of 'blocks' in the financial document may be identified by finding their outer borders and/or the unbroken white (or blank) spaces between them. These shapes may be compared to general shapes in the library to see if there are any matches. In another approach, unique blocks of text present in the most common W-2 form layouts may be identified. For example, one payroll provider uses a 2-row, 3-column layout for the W-2 form, but two-thirds of the top row is filed with a custom 'summary.' If a unique phrase in a small targeted area in this region can be identified, then this type of W-2 form can be identified without processing the entire image.

As noted previously, the financial document may also be identified during the OCR technique (such as on the server) using the predefined information (such as an employer identification number or an employee's Social Security number) in the set of financial documents (such as the different types of W-2 forms). For example, by comparing the image of the financial document to this library, the image may be automatically cropped down to one copy of the financial information in the W-2 form prior to performing the OCR technique (if the camera that took the picture had sufficient resolution). Alternatively or additionally, if there is not enough resolution to allow cropping of the original image, the area in the financial document that the user should focus or zoom in on may be identified, and this information may be feedback to the user's digital camera or cellular telephone. Then, a user interface on this portable electronic device may display a marked up version of the image and along with instructions on how to retake the image This is shown in FIG. 3, which presents a block diagram illustrating a user interface 300 with the feedback about the image that is provided to the user in method 100 (FIGS. 1 and 2), which may be displayed on a portable electronic device that is used by the user (such as a digital camera or a cellular telephone that includes a digital camera, or on a personal computer or tablet personal computer). In particular, this user interface may display instructions 310 to the user to generate the second (improved) image (such as instructing the user to retake a picture of the financial document). Additionally, the feedback may include a third image 312 (such as a marked-up version of the original image) that illustrates the orientation of the second image and/or the portion of the financial document to include in the second image (such as portion 314, as opposed to extraneous information 316).

Note that by providing the feedback, assisting the user in obtaining a better picture or image (i.e., one with an improved quality metric), and thus by facilitating accurate processing using the OCR technique, the feedback technique may (indirectly) facilitate the continued use of paper of physical documents, which remain popular with users.

While the preceding examples used an image of the financial document to illustrate the financial technique, in other embodiments the user may scan the financial document (for example, using a printer). Furthermore, the feedback may be provided to the user on a display, such as a computer screen. Note that the feedback may be provided in real time, such as when the image is scanned.

We now describe embodiments of the system and its use. FIG. 4 presents a block diagram illustrating a system 400 that performs method 100 (FIGS. 1 and 2). In this system, a user of a portable electronic device 410 (such as a cellular telephone or tablet personal computer that includes a digital camera or a scanner) acquires an image of a financial document. After initial processing and/or analysis (if any), this image may be provided to server 414 via network 412. As noted previously, server 414 may complete the analysis of the image based on predefined information in a set of financial documents, and may determine a quality metric for the image. Furthermore, feedback based on the quality metric may be provided to portable electronic device 410 via network 412 for presentation to the user.

After the user has acquired an improved image, this image may be provided to server 414 via network 412. OCR software may be used to extract the financial information from the improved image. Then, server 414 may provide, via network 412, the extracted financial information to a computer 416, which is used by the user. For example, the user may use stand-alone financial software or a portion of another application that is resident on and which executes on computer 416. In this case, the extracted financial information may be included in one or more data structures in a computer-readable memory on computer 416 that are associated with the financial software.

Alternatively, when using the financial software the user may interact with a web page that is provided by server 414 via network 412, and which is rendered by a web browser on computer 416. Thus, the financial software application may be an application tool (such as a financial software application tool) that is embedded in the web page (and which executes in a virtual environment of the web browser), i.e., the financial software application tool may be provided to the user via a client-server architecture. In these embodiments, the extracted financial information may be stored in one or more data structures that are associated with the financial software, and which are located in system 400 (such as on server 414).

Note that the image(s), the feedback and/or the financial information in system 400 may be stored at one or more locations in system 400 (i.e., locally or remotely). Moreover, because this data may be sensitive in nature, it may be encrypted. For example, stored data and/or data communicated via network 412 may be encrypted.

FIG. 5 presents a block diagram illustrating a system 500 (such as a computer system) that performs method 100 (FIGS. 1 and 2), such as server 414 (FIG. 4). System 500 includes one or more processing units or processors 510, a communication interface 512, a user interface 514, and one or more signal lines 522 coupling these components together. Note that the one or more processors 510 may support parallel processing and/or multi-threaded operation, the communication interface 512 may have a persistent communication connection, and the one or more signal lines 522 may constitute a communication bus. Moreover, the user interface 514 may include: a display 516, a keyboard 518, and/or a pointer 520, such as a mouse.

Memory 524 in system 500 may include volatile memory and/or non-volatile memory. More specifically, memory 524 may include: ROM, RAM, EPROM, EEPROM, flash memory, one or more smart cards, one or more magnetic disc storage devices, and/or one or more optical storage devices. Memory 524 may store an operating system 526 that includes procedures (or a set of instructions) for handling various basic system services for performing hardware-dependent tasks. Memory 524 may also store procedures (or a set of instructions) in a communication module 528. These communication procedures may be used for communicating with one or more computers and/or servers, including computers and/or servers that are remotely located with respect to system 500.

Memory 524 may also include multiple program modules (or sets of instructions), including: financial software 530 (or a set of instructions), analysis module 532 (or a set of instructions), optional character-recognition module 534 (or a set of instructions), optional image-processing module 536 (or a set of instructions), quality-assessment module 538 (or a set of instructions), feedback module 540 (or a set of instructions), and/or encryption module 542 (or a set of instructions). Note that one or more of these program modules (or sets of instructions) may constitute a computer-program mechanism.

Figure 6:
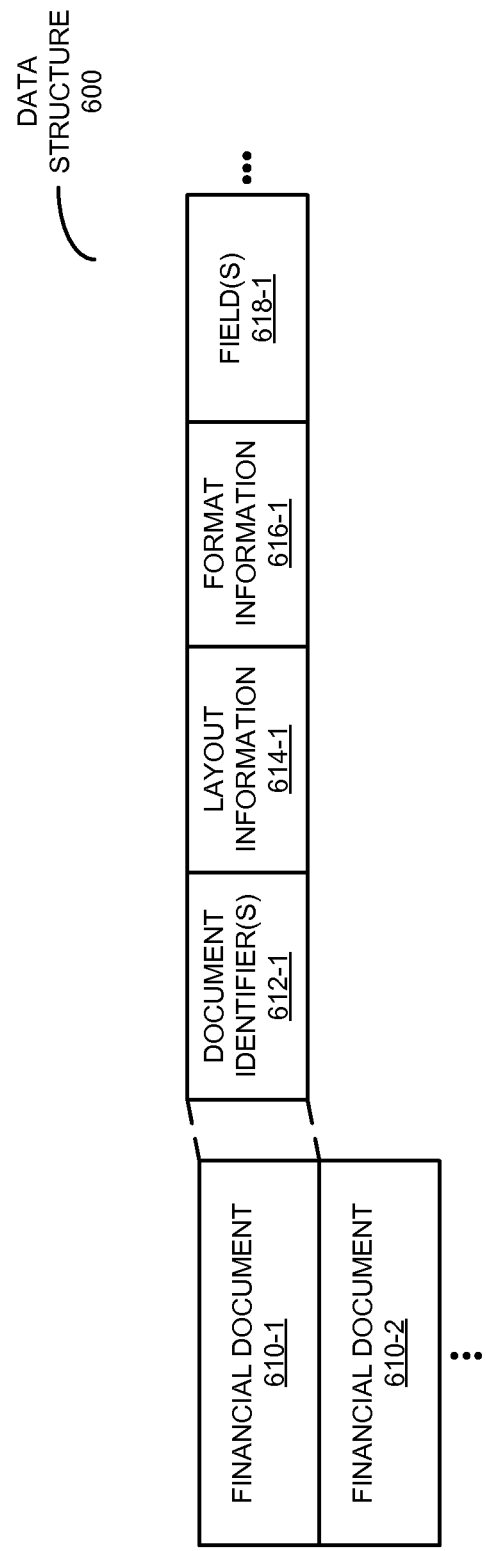
FIG. 6 is a block diagram illustrating a data structure for use in the system of FIG. 5 in accordance with an embodiment of the present disclosure.

During method 100 (FIGS. 1 and 2), a user may use provide one or more images 544 of a financial document (which were acquired by the user using a camera or a scanner) using communication module 528. Analysis module 532 may analyze the one or more images 544 using predefined documents 546, such as financial document A 548-1 or financial document B 548-2 (which may be different types of W-2 forms), in a data structure. This data structure is shown in FIG. 6, which presents a block diagram illustrating a data structure 600. In particular, data structure 600 may include predefined information associated with financial documents 610. For example, the predefined information for financial documents 610-1 may include: one or more a document identifiers 612-1, layout information 614-1, format information 616-1, and/or one or more fields 618-1. Referring back to FIG. 5, in some embodiments analysis module 532 analyzes the one or more images 544 using optional character-recognition module 534 and/or optional image-processing module 536.

Then, quality-assessment module 538 uses analysis results 550 provided by analysis module 532 to determine one or more quality metrics 552 for the one or more images 544. Furthermore, feedback module 540 may provide feedback 554 to the user using communication module 528. This feedback may be based on the one or more quality metrics 552, and may assist the user in obtaining (and then providing) one or more improved images 556 (which are received using communication module 528).

Analysis module 532 may extract financial information 558 from the one or more improved images 556, for example, by using optional character-recognition module 534. This financial information may be used by subsequent financial software 530. For example, it may be used to pre-populate fields in an income-tax return or to perform a financial calculation.

Furthermore, because the one or more images 544, feedback 554, the one or more improved images 556 and/or financial information 558 may be sensitive in nature, in some embodiments at least some of the data stored in memory 524 and/or at least some of the data communicated using communication module 528 is encrypted using encryption module 542. Additionally, in some embodiments one or more of the modules in memory 524 may be included in financial software 530.

Instructions in the various modules in memory 524 may be implemented in: a high-level procedural language, an object-oriented programming language, and/or in an assembly or machine language. Note that the programming language may be compiled or interpreted, e.g., configurable or configured, to be executed by the one or more processors 510.

Although system 500 is illustrated as having a number of discrete items, FIG. 5 is intended to be a functional description of the various features that may be present in system 500 rather than a structural schematic of the embodiments described herein. In practice, and as recognized by those of ordinary skill in the art, the functions of system 500 may be distributed over a large number of servers or computers, with various groups of the servers or computers performing particular subsets of the functions. In some embodiments, some or all of the functionality of system 500 may be implemented in one or more application-specific integrated circuits (ASICs) and/or one or more digital signal processors (DSPs).

Electronic devices, computers and servers in systems 400 (FIG. 4) and/or 500 may include one of a variety of devices capable of manipulating computer-readable data or communicating such data between two or more computing systems over a network, including: a personal computer, a laptop computer, a mainframe computer, a tablet personal computer (which may include a camera), a portable electronic device (such as a cellular phone, a digital camera or PDA), a server and/or a client computer (in a client-server architecture). Moreover, network 412 (FIG. 4) may include: the Internet, World Wide Web (WWW), an intranet, a cellular-telephone network, LAN, WAN, MAN, or a combination of networks, or other technology enabling communication between computing systems or electronic devices.

In exemplary embodiments, the financial-software application (i.e., financial software 530) includes: Quicken™ and/or TurboTax™ (from Intuit, Inc., of Mountain View, Calif.), Microsoft Money™ (from Microsoft Corporation, of Redmond, Wash.), SplashMoney™ (from SplashData, Inc., of Los Gatos, Calif.), Mvelopes™ (from In2M, Inc., of Draper, Utah), and/or open-source applications such as Gnucash™, PLCash™, Budget™ (from Snowmint Creative Solutions, LLC, of St. Paul, Minn.), and/or other planning software capable of processing financial information.

Moreover, the financial-software application may include software such as: QuickBooks™ (from Intuit, Inc., of Mountain View, Calif.), Peachtree™ (from The Sage Group PLC, of Newcastle Upon Tyne, the United Kingdom), Peachtree Complete™ (from The Sage Group PLC, of Newcastle Upon Tyne, the United Kingdom), MYOB Business Essentials™ (from MYOB US, Inc., of Rockaway, N.J.), NetSuite Small Business Accounting™ (from NetSuite, Inc., of San Mateo, Calif.), Cougar Mountain™ (from Cougar Mountain Software, of Boise, Id.), Microsoft Office Accounting™ (from Microsoft Corporation, of Redmond, Wash.), Simply Accounting™ (from The Sage Group PLC, of Newcastle Upon Tyne, the United Kingdom), CYMA IV Accounting™ (from CYMA Systems, Inc., of Tempe, Ariz.), DacEasy™ (from Sage Software SB, Inc., of Lawrenceville, Ga.), Microsoft Money™ (from Microsoft Corporation, of Redmond, Wash.), Tally.ERP (from Tally Solutions, Ltd., of Bangalore, India) and/or other payroll or accounting software capable of processing payroll information.

User interface 300 (FIG. 3), system 400 (FIG. 4), system 500 (FIG. 5) and/or data structure 600 may include fewer components or additional components. Moreover, two or more components may be combined into a single component, and/or a position of one or more components may be changed. For example, as noted previously, operation in method 100 (FIGS. 1 and 2) may be performed on one device or multiple devices in system 400 (FIG. 4) and/or system 500 (FIG. 5). In some embodiments, the functionality of systems 400 (FIG. 4) and/or 500 may be implemented more in hardware and less in software, or less in hardware and more in software, as is known in the art.

While the preceding discussion illustrated the use of the feedback technique with images of financial documents and/or for use with financial software, more generally this approach may be used to provide feedback about images associated with a wide variety of documents and/or for use with many different types of software programs or applications. For example, the images may be of documents such as: a medical record or report associated with a user, an insurance form, a claim form, a spreadsheet, a presentation, a word-processing document, etc. In addition, the software program may include: a medical application (e.g., a diagnostic program, an electronic medical record program, a medical billing program, etc.), word-processing software, spreadsheet software, presentation software, an email program, mathematical software, etc.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer-implemented method for providing feedback about an image of a financial document to a user, comprising:
receiving a preview of a first image of the financial document from the user when the user is taking a picture of the financial document using an electronic device;
in response to determining that the received preview of the financial document includes multiple financial documents with the same financial-document layout, providing a first real-time guidance to the user, wherein the first real-time guidance instructs the user on improving the first image of the document;
receiving a second image of the financial document from the user, wherein the second image is an improved version of the first image of the document based on the first real-time guidance to the user;
analyzing the second image to identify one or more areas in the second image that require further improvement based on a quality metric, wherein the quality metric is based on whether the image includes multiple financial documents with the same financial-document layout; and
in response to the analysis, providing a feedback to the user, wherein the feedback provides a second real-time guidance to the user to zoom in on an area in the second image to provide an improved version of the second image, wherein the improved version of the second image includes a single financial document from the multiple financial documents.

2. The method of claim 1, wherein the multiple financial documents include an income-tax document.

3. The method of claim 1, wherein analyzing the image involves optical character recognition or image processing.

4. The method of claim 1, wherein analyzing the image involves identifying a location with financial information in the image.

5. The method of claim 1, wherein analyzing the image involves cropping the image.

6. The method of claim 1, wherein analyzing the image involves identifying the multiple financial documents.

7. The method of claim 1, wherein the quality metric includes information about extraneous information in the image.

8. The method of claim 1, wherein generating the second image involves taking a photograph of or scanning at least a portion of the financial document.

9. The method of claim 1, wherein the instructions specify an orientation of the second image.

10. The method of claim 9, wherein the feedback includes a third image that illustrates the specified orientation of the second image and the single financial document to include in the second image.

11. The method of claim 1, wherein the real-time guidance for improving the first image of the document includes:
instructing the user to rotate the electronic device to a different orientation to get an improved image of the document.

12. A non-transitory computer-readable storage medium storing instructions that when executed by a computer cause the computer to perform a method for providing feedback about an image of a financial document to a user, comprising:
instructions for receiving a preview of a first image of the financial document from the user when the user is taking a picture of the financial document using an electronic device;
instructions for, in response to determining that the received preview of the financial document includes multiple financial documents with the same financial-document layout, providing a first real-time guidance to the user, wherein the first real-time guidance instructs the user on improving the first image of the document;
instructions for receiving a second image of the financial document from the user, wherein the second image is an improved version of the first image of the document based on the first real-time guidance to the user;
instructions for analyzing the second image to identify one or more areas in the second image that require further improvement based on a quality metric, wherein the quality metric is based on whether the image includes multiple financial documents with the same financial-document layout; and
instructions for, in response to the analysis, providing a feedback to the user, wherein the feedback provides a second real-time guidance to the user to zoom in on an area in the second image to provide an improved version of the second image, wherein the improved version of the second image includes a single financial document from the multiple financial documents.

13. The non-transitory computer readable storage medium of claim 12, wherein the financial document includes an income-tax document.

14. The non-transitory computer readable storage medium of claim 12, wherein analyzing the image involves optical character recognition or image processing.

15. The non-transitory computer readable storage medium of claim 12, wherein analyzing the image involves identifying a location with financial information in the image.

16. The non-transitory computer readable storage medium of claim 12, wherein analyzing the image involves cropping the image.

17. The non-transitory computer readable storage medium of claim 12, wherein analyzing the image involves identifying the multiple financial documents.

18. The non-transitory computer readable storage medium of claim 12, wherein the quality metric includes information about extraneous information in the image.

19. The non-transitory computer readable storage medium of claim 12, wherein the instructions specify an orientation of the second image.

20. The non-transitory computer readable storage medium of claim 19, wherein the feedback includes a third image that illustrates the specified orientation of the second image and the single financial document to include in the second image.

21. A system, comprising:
a processor;
memory; and
a program module, wherein the program module is stored in the memory and configurable to be executed by the processor to facilitate providing feedback about an image of a financial document to a user, the program module including:
instructions for receiving a preview of a first image of the financial document from the user when the user is taking a picture of the financial document using an electronic device;
instructions for, in response to determining that the received preview of the financial document includes multiple financial documents with the same financial-document layout, providing a first real-time guidance to the user, wherein the first real-time guidance instructs the user on improving the first image of the document;
instructions for receiving a second image of the financial document from the user, wherein the second image is an improved version of the first image of the document based on the first real-time guidance to the user;
instructions for analyzing the second image to identify one or more areas in the second image that require further improvement based on a quality metric, wherein the quality metric is based on whether the image includes multiple financial documents with the same financial-document layout; and
instructions for, in response to the analysis, providing a feedback to the user, wherein the feedback provides a second real-time guidance to the user to zoom in on an area in the second image to provide an improved version of the second image, wherein the improved version of the second image includes a single financial document from the multiple financial documents.

* * * * *